United States Patent
Sun et al.

(10) Patent No.: US 11,812,428 B2
(45) Date of Patent: Nov. 7, 2023

(54) CONTROLLING AN ADMISSION PROBABILITY OF A RESOURCE POOL FOR CONFIGURED GRANT UPLINK COMMUNICATION

(71) Applicant: QUALCOMM Incorporated, San Diego, CA (US)

(72) Inventors: Jing Sun, San Diego, CA (US); Yisheng Xue, San Diego, CA (US); Xiaoxia Zhang, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/304,513

(22) Filed: Jun. 22, 2021

(65) Prior Publication Data

US 2021/0400695 A1 Dec. 23, 2021

Related U.S. Application Data

(60) Provisional application No. 63/042,791, filed on Jun. 23, 2020.

(51) Int. Cl.
*H04W 72/12* (2023.01)
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2015/0016402 A1* | 1/2015 | Wager | H04L 5/0091 370/329 |
| 2017/0079016 A1* | 3/2017 | Nord | H04W 24/10 |
| 2018/0359177 A1* | 12/2018 | Sorenson, III | H04L 43/0817 |
| 2019/0357054 A1* | 11/2019 | Liu | H04L 27/0006 |

(Continued)

FOREIGN PATENT DOCUMENTS

| | | | | |
|---|---|---|---|---|
| CN | 106162513 B | * | 3/2020 | |
| CN | 113243123 A | * | 8/2021 | H04W 28/0231 |

(Continued)

*Primary Examiner* — Kodzovi Acolatse
(74) *Attorney, Agent, or Firm* — QUALCOMM Incorporated

(57) ABSTRACT

Various aspects of the present disclosure generally relate to wireless communication. In some aspects, a user equipment may receive a configuration of a resource pool for configured grant uplink communications, wherein the resource pool is associated with an admission probability parameter that controls an admission probability for access to the resource pool; receive an indication that modifies the admission probability; and perform an admission control procedure to attempt access to the resource pool for transmission of a configured grant uplink communication based at least in part on the indication, wherein the admission control procedure is associated with the modified admission probability. Numerous other aspects are provided.

28 Claims, 7 Drawing Sheets

(56) References Cited

U.S. PATENT DOCUMENTS

2021/0297921 A1* 9/2021 Pragada ................ H04W 36/32
2022/0060929 A1* 2/2022 Hassan ............. H04W 28/0284

FOREIGN PATENT DOCUMENTS

WO    WO-2016018009 A1 * 2/2016 ............ H04J 11/003
WO    WO-2020126657 A1 * 6/2020 ........ H04W 28/0231
WO    WO-2021213979 A1 * 10/2021 .......... H04W 72/121

* cited by examiner

CONTROLLING AN ADMISSION PROBABILITY OF A RESOURCE POOL FOR CONFIGURED GRANT UPLINK COMMUNICATION

CROSS-REFERENCE TO RELATED APPLICATION

This Patent Application claims priority to U.S. Provisional Patent Application No. 63/042,791, filed on Jun. 23, 2020, entitled "CONTROLLING AN ADMISSION PROBABILITY OF A RESOURCE POOL FOR CONFIGURED GRANT UPLINK COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for controlling an admission probability of a resource pool for configured grant uplink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a configuration of a resource pool for configured grant uplink communications, wherein the resource pool is associated with an admission probability parameter that controls an admission probability for access to the resource pool; receiving an indication that modifies the admission probability, resulting in a modified admission probability; and performing an admission control procedure to attempt access to the resource pool for transmission of a configured grant uplink communication based at least in part on the indication, wherein the admission control procedure is associated with the modified admission probability.

In some aspects, a method of wireless communication, performed by a base station, may include transmitting, to a UE, a configuration of a resource pool for configured grant uplink communications, wherein the resource pool is associated with an admission probability parameter that controls an admission probability for access to the resource pool; and transmitting an indication that modifies the admission probability for the UE.

In some aspects, a UE for wireless communication may include a memory and one or more processors coupled to the memory. The one or more processors may be configured to receive a configuration of a resource pool for configured grant uplink communications, wherein the resource pool is associated with an admission probability parameter that controls an admission probability for access to the resource pool; receive an indication that modifies the admission probability, resulting in a modified admission probability; and perform an admission control procedure to attempt access to the resource pool for transmission of a configured grant uplink communication based at least in part on the indication, wherein the admission control procedure is associated with the modified admission probability.

In some aspects, a base station for wireless communication may include a memory and one or more processors coupled to the memory. The one or more processors may be configured to transmit, to a UE, a configuration of a resource pool for configured grant uplink communications, wherein the resource pool is associated with an admission probability parameter that controls an admission probability for access to the resource pool; and transmit an indication that modifies the admission probability for the UE.

In some aspects, a non-transitory computer-readable medium may store one or more instructions for wireless communication. The one or more instructions, when executed by one or more processors of a UE, may cause the one or more processors to receive a configuration of a resource pool for configured grant uplink communications, wherein the resource pool is associated with an admission probability parameter that controls an admission probability for access to the resource pool; receive an indication that modifies the admission probability, resulting in a modified admission probability; and perform an admission control procedure to attempt access to the resource pool for transmission of a configured grant uplink communication based at least in part on the indication, wherein the admission control procedure is associated with the modified admission probability.

In some aspects, a non-transitory computer-readable medium may store one or more instructions for wireless communication. The one or more instructions, when executed by one or more processors of a base station, may cause the one or more processors to transmit, to a UE, a configuration of a resource pool for configured grant uplink communications, wherein the resource pool is associated with an admission probability parameter that controls an admission probability for access to the resource pool; and transmit an indication that modifies the admission probability for the UE.

In some aspects, an apparatus for wireless communication may include means for receiving a configuration of a resource pool for configured grant uplink communications, wherein the resource pool is associated with an admission probability parameter that controls an admission probability for access to the resource pool; means for receiving an indication that modifies the admission probability, resulting in a modified admission probability; and means for performing an admission control procedure to attempt access to the resource pool for transmission of a configured grant uplink communication based at least in part on the indication, wherein the admission control procedure is associated with the modified admission probability.

In some aspects, an apparatus for wireless communication may include means for transmitting, to a UE, a configuration of a resource pool for configured grant uplink communications, wherein the resource pool is associated with an admission probability parameter that controls an admission probability for access to the resource pool; and means for transmitting an indication that modifies the admission probability for the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
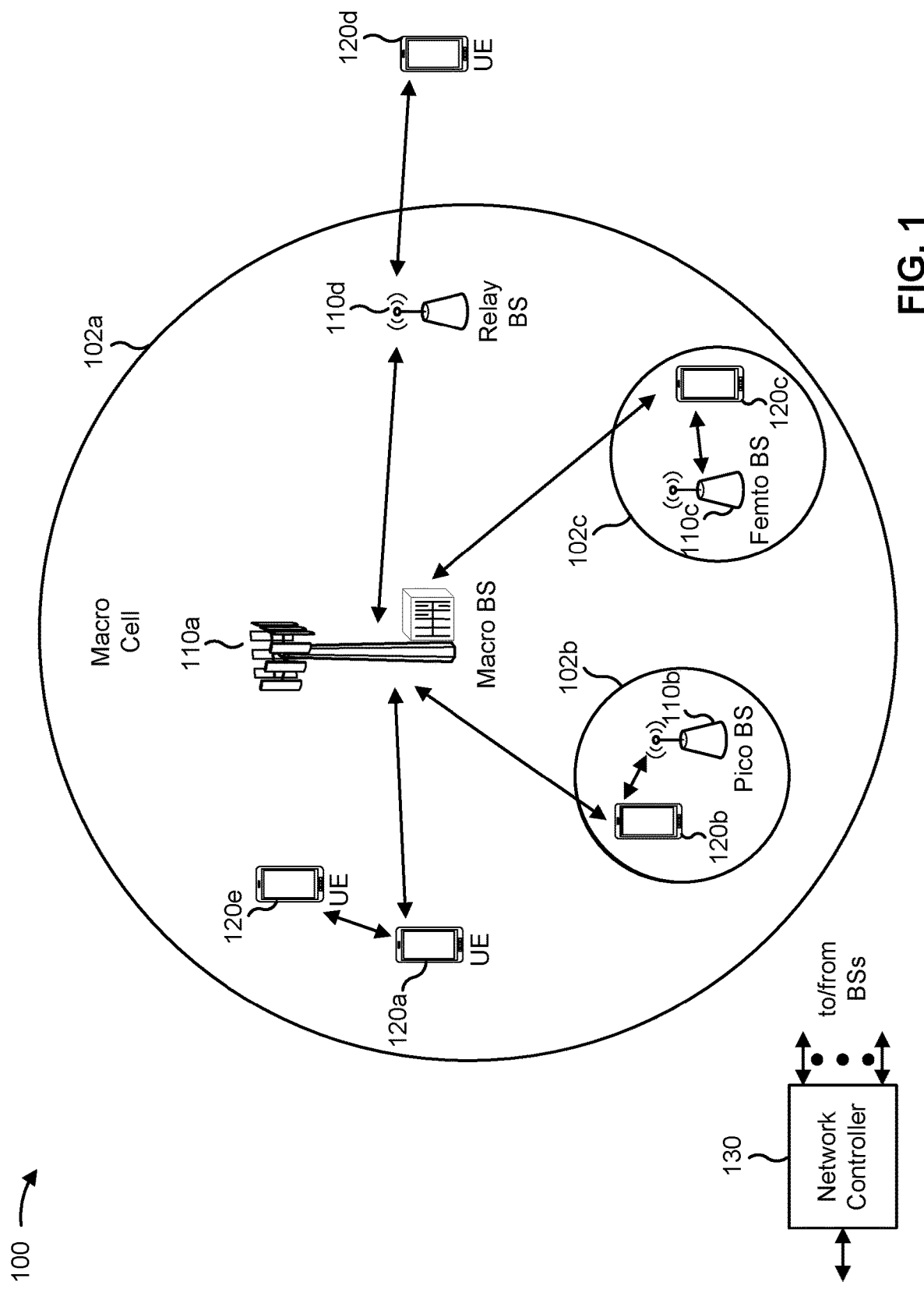
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
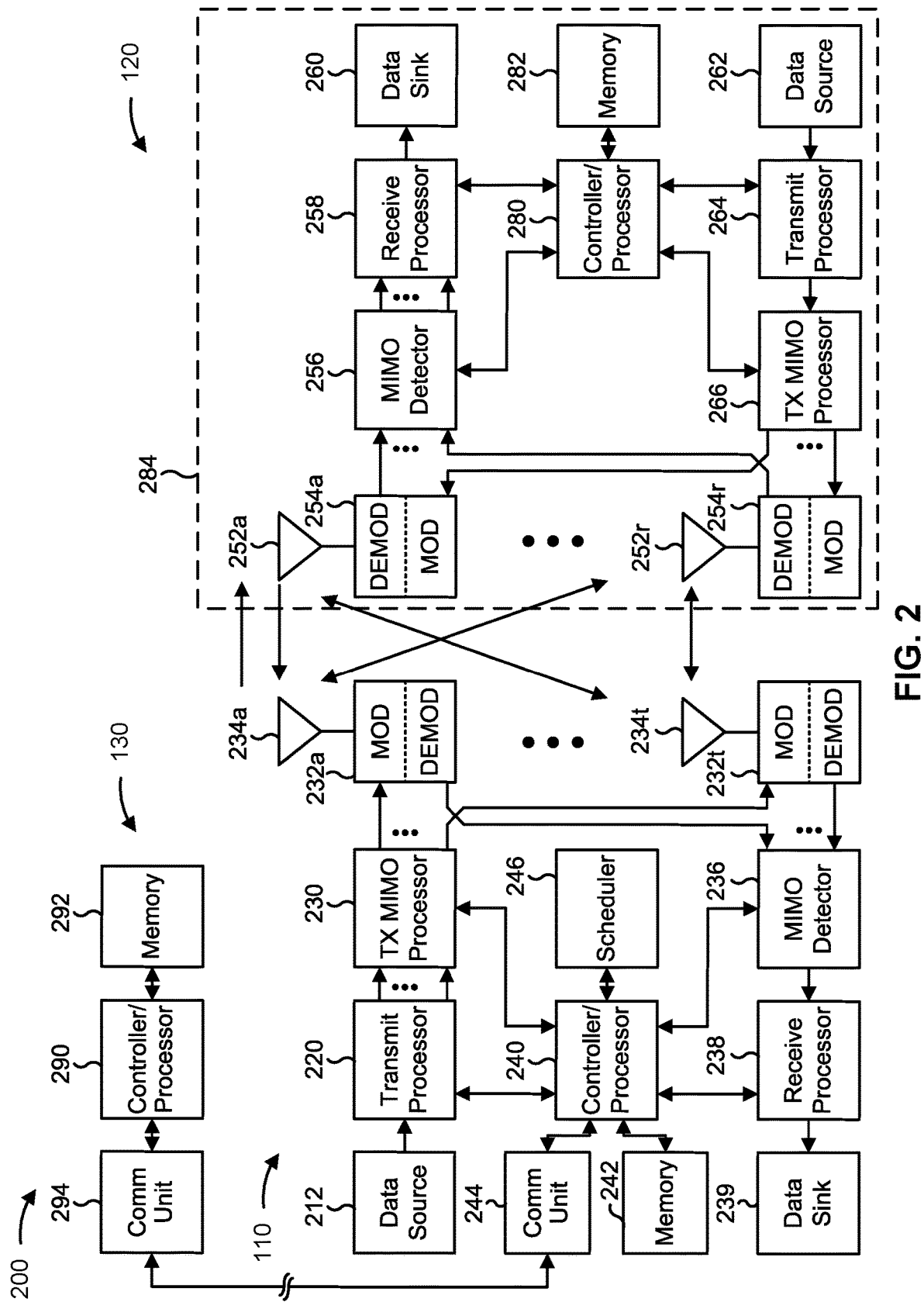
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with controlling an admission probability of a resource pool for configured uplink communication, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 may include means for receiving a configuration of a resource pool for configured grant uplink communications, wherein the resource pool is associated with an admission probability parameter that controls an admission probability for access to the resource pool; means for receiving an indication that modifies the admission probability, resulting in a modified admission probability; and/or means for performing an admission control procedure to attempt access to the resource pool for transmission of a configured grant uplink communication based at least in part on the indication, wherein the admission control procedure is associated with the modified admission probability. In some aspects, such means may include one or more components of the UE 120 described in connection with FIG. 2, such as controller/processor 280, transmit processor 264, TX MIMO processor 266, modem 254, antenna 252, MIMO detector 256, receive processor 258, and/or memory 282.

In some aspects, the base station 110 may include means for transmitting, to a UE, a configuration of a resource pool for configured grant uplink communications, wherein the resource pool is associated with an admission probability parameter that controls an admission probability for access to the resource pool; and/or means for transmitting an indication that modifies the admission probability for the UE. In some aspects, such means may include one or more components of the base station 110 described in connection with FIG. 2, such as antenna 234, modem 232, MIMO detector 236, receive processor 238, controller/processor 240, transmit processor 220, TX MIMO processor 230, antenna 234, and/or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Some UEs may be associated with a reduced capability relative to a baseline UE (e.g., an enhanced mobile broadband (eMBB) UE). For example, a reduced capability (RedCap) UE, an Internet of Things (IoT) UE, an MTC UE, or an NR Light UE, among other examples, may be associated with a reduced capability relative to an eMBB UE. A RedCap UE may be used for an industrial wireless sensor, a video surveillance device, or a smart wearable device, among other examples. A RedCap UE may have a lower communicative capacity, relative to a baseline UE (e.g., an eMBB UE). For example, a RedCap UE may be limited in terms of maximum bandwidth (e.g., 5 MHz, 10 MHz, 20 MHz, etc.), maximum transmission power (e.g., 20 dBm, 14 dBm, etc.), and/or number of receive antennas (e.g., 1 receive antenna, 2 receive antennas, etc.). A RedCap UE may also have a prolonged battery life, relative to a baseline UE (e.g., an eMBB UE). RedCap UEs may co-exist with UEs implementing protocols such as eMBB, ultra-reliable low latency communication (URLLC), and/or LTE NB-IoT/MTC, among other examples. In some aspects, RedCap UEs, such as industrial wireless sensors, may be associated with intensive uplink traffic, moderate reliability and latency (e.g., non-URLLC), small packet size with a relatively long TX interval (e.g., low data rate), and high capacity (e.g., up to 1 UE per square meter).

In some cases, a UE may use a dynamic grant for uplink communication, wherein the UE receives information specifying a resource for a transmission to be performed by the UE. However, in some cases, such as with a large quantity of reduced-capability UEs, dynamic grant based communications may challenge a capacity of a physical downlink control channel (PDCCH). In some cases, a UE may use a configured grant for uplink communication, wherein the configured grant may be configured using configuration information that specifies a recurring grant for an uplink transmission of the UE.

Figure 3:
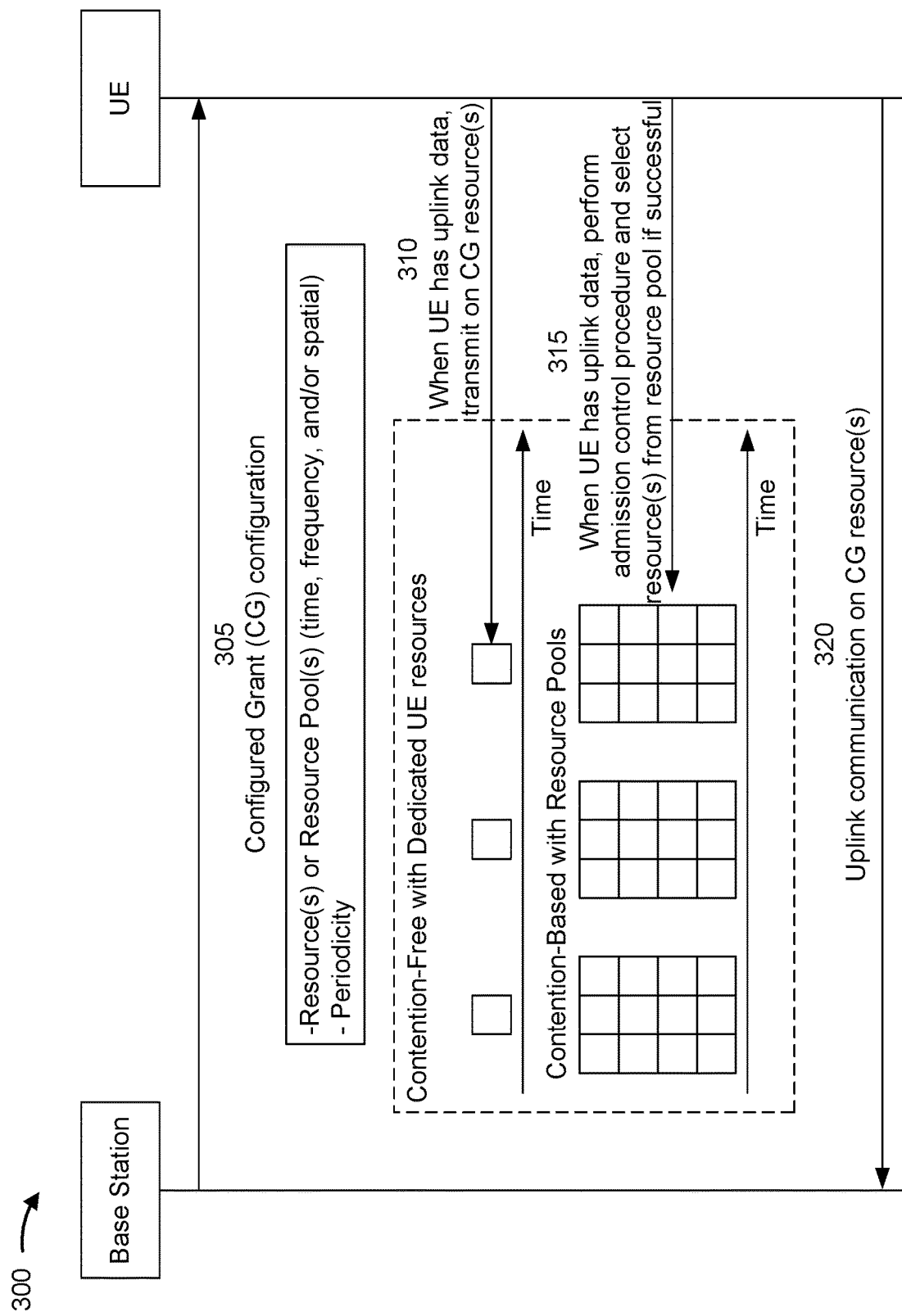
FIG. 3 is a diagram illustrating an example of configured grant (CG) communication, in accordance with the present disclosure.

FIG. 3 is a diagram illustrating an example 300 of configured grant (CG) communication, in accordance with the present disclosure. As shown in FIG. 3, example 300 includes a base station and a UE.

As shown in FIG. 3, and by reference number 305, the base station may transmit a CG configuration to the UE. For example, the base station may transmit CG configuration information (e.g., radio resource configuration (RRC) information and/or downlink control information) that identifies a CG. In some aspects, the configuration information identifying the CG may indicate a resource allocation (e.g., time domain, frequency domain, spatial domain, and/or code domain), a periodicity associated with the resource allocation, and/or the like. The CG configuration information may identify a resource or set of resources in which the UE is to perform an uplink communication (e.g., data and/or control information). For example, the CG configuration information may identify a resource allocation for a physical uplink shared channel (PUSCH) of the UE. In some aspects, the CG configuration information may identify a resource pool or multiple resource pools which may be available for the UE to perform an uplink transmission.

In some aspects, the CG configuration information received by the UE may be used to configure a contention-free CG with resources dedicated for the UE to transmit uplink communications. In this case, the CG configuration information may indicate a resource allocation (e.g., time domain, frequency domain, spatial domain, and/or code domain) dedicated for the UE to use to transmit uplink communications. The CG configuration information may also be used to configure the resource allocation for the UE to occur periodically, such that the resource allocation corresponds to periodically occurring transmission time occasions.

As shown in FIG. 3, and by reference number 310, when the UE has uplink data to transmit, the UE transmits the uplink data on the CG resources identified by the CG configuration information. For example, the UE transmits the uplink data in one of the CG uplink occasions identified in the CG configuration information using the configured resource allocation.

A CG configuration with regular periodic CG uplink occasions with a dedicated resource allocation for the UE may be convenient for a UE with periodic uplink traffic (e.g., with trivial jitter). The CG configuration information may be used to configure the periodicity associated with the resource allocation to associate CG uplink occasions with periodic nominal arrival times at which traffic to be transmitted to the base station is expected to arrive at (or be ready to be transmitted by) the UE. However, the actual arrival times at which the traffic arrives (or is ready to be transmitted) by the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG uplink occasion. The UE may be configured with multiple CG uplinks to allow the UE to repeatedly transmit the CG uplink communication and increase the likelihood that the base station receives the CG uplink communication. NR CG uplink may depend on dynamic grant re-transmission. In some aspects, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a communication may have been already decoded after the first one or more repetitions (early decoding) such that a remainder of the repetitions are unnecessary. Unlike a downlink case, this type of inefficient consumption of system resources cannot be addressed by scheduling, as the base station does not know exactly when traffic will arrive at the UEs.

Statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the base station, cases in which a traffic arrival density for traffic arriving at the UEs is time varying. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 3, the CG configuration information received by the UE may configure a contention-based CG with resource pools that are available for multiple UEs to use to transmit uplink communications. The contention-based CG configuration uses statistical multiplexing to share the resource pools among multiple UEs. A resource pool includes multiple resources (e.g., time domain, frequency domain, spatial domain, and/or code domain) that can be allocated for uplink transmissions by the UE. For example, an x-axis of a resource pool may indicate transmission times and the y-axis of the resource pool may indicate resources (e.g., frequency domain, spatial domain, and/or code domain) that can be allocated at each transmission time. In some aspects, the same resource pools may be configured for multiple UEs.

Statistical multiplexing schemes may involve spreading control and overloading control. For example, spreading relates to distributing traffic (as interference to others) into a resource pool. In a specific example, direct spreading CDMA may be utilized in legacy 3G systems. NR systems which rely on an OFDMA network may utilize organized randomized resource selection, in which the base station can identify sources that contribute to collisions in a resource pool and/or local overloading of a resource pool.

Overloading control relates to controlling a level of multiplexing within a stable region. For example, overly aggressive multiplexing may result in an unusable resource pool. Rise over thermal (RoT) based control (in addition to power control) may be utilized in legacy 3G systems. In 3GPP, a central scheduler may be used to assign grants to respective UEs. In 3GPP Project 2 (3GPP2), a hybrid approach may be used in which an access network sends a reverse link activity bit to guide autonomous rate selection at respective UEs. Channel busy ratio (CBR) based control may be utilized in NR sidelink. For example, each sidelink UE may autonomously measure CBR and regulate its channel use based at least in part on the measured CBR.

As further shown in FIG. 3, and by reference number 315, for the contention-based CG configuration, when the UE has uplink data to be transmitted, the UE performs an admission control procedure and selects one or more resources from the resource pool if the admission control procedure is successful. In some aspects, the admission control procedure may include the UE selecting a random number (e.g., between 0 and 1), comparing the random number with an admission threshold, and determining whether the random number satisfies the admission threshold. If the random number satisfies the admission threshold, the admission is successful and the UE may select a resource from the resource pool to transmit the uplink communication. The admission threshold for admission control may be set by the base station in the CG configuration, may be set in a standard, and/or may be stored by the base station.

In response to the UE determining that the random number satisfies the admission threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 3, and by reference number 320, the UE transmits the uplink communication to the base station on the CG resource. For example, the UE may transmit the uplink communication as a PUSCH communication using a resource allocation identified by the CG.

As described above, multiple UEs may be configured to share the same resource pool, and the admission to the resource pool for the UEs may be determined by an admission threshold. However, in some cases, too many UEs may gain admission to the resource pool, leading to overloading of the resource pool. Overloading of the resource pool may result in unreliable and/or failed uplink communications, delay, and/or additional uplink/downlink control overhead. This may cause a decrease in network reliability, speed, and/or the like, and consume additional computing resources (e.g., processing resources, memory resources, and/or communication resources) and/or networking resources.

Some techniques and apparatuses described herein enable a base station to dynamically control an admission probability of a resource pool for CG uplink communication. A base station may detect overloading of a shared resource pool for CG uplink communication and dynamically modify an admission probability of the resource pool for a specific UE or a group of UEs to reduce overloading of the resource pool. As a result, overloading of resource pools for CG uplink communications may be reduced and uplink communications from UEs to a base station may be performed more efficiently. This reduces unreliable and/or failed uplink communications, delay, and/or additional uplink/downlink control overhead caused by resource pool overloading, thus increasing network reliability and/or speed and conserving computing resources (e.g., processing resources, memory resources, and/or communication resources) and/or networking resources.

As indicated above, FIG. 3 is provided as an example. Other examples may differ from what is described with respect to FIG. 3.

Figure 4:
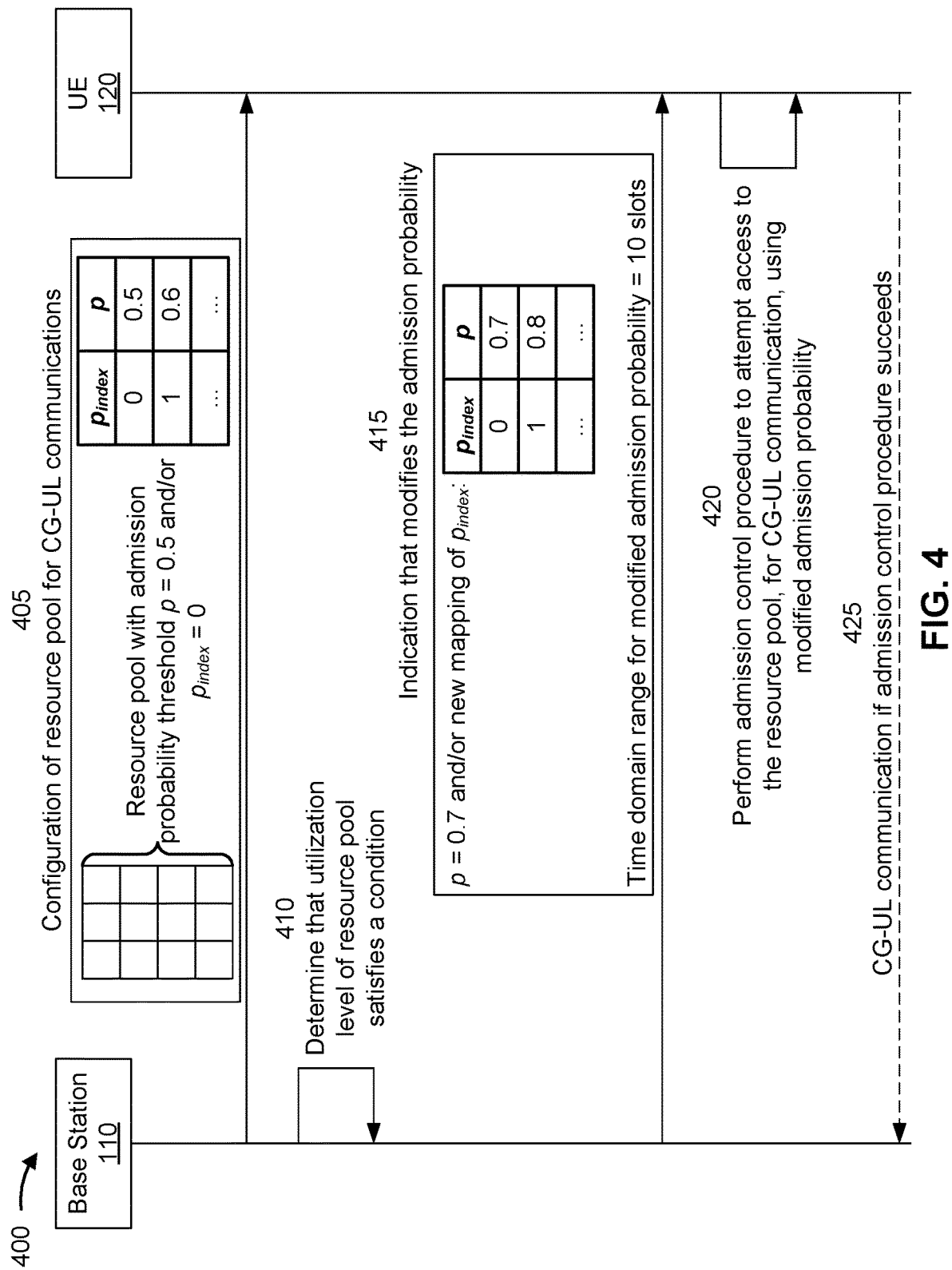
FIGS. 4-5 are diagrams illustrating examples associated with controlling an admission probability of a resource pool for CG uplink communication, in accordance with the present disclosure.

FIG. 4 is a diagram illustrating an example 400 associated with controlling an admission probability of a resource pool for CG uplink communication, in accordance with the present disclosure. As shown in FIG. 4, a base station 110 and a UE 120 may communicate with one another.

As shown by reference number 405, the base station 110 transmits, to the UE 120, a configuration of a resource pool for CG uplink communications. For example, the base station 110 may transmit, to the UE 120, configuration information (e.g., RRC information and/or downlink control information) that identifies the resource pool for CG uplink communications. The resource pool includes multiple resources (e.g., time domain, frequency domain, spatial domain, and/or code domain) that can be allocated for uplink communication by the UE 120. In some aspects, the base station 110 may configure the same resource pool for the UE 120 and one or more other UEs, such that the UE 120 and the one or more other UEs can be allocated resources from the configured resource pool for CG uplink communications.

The resource pool may identify one or more uplink transmission occasions. For example, the resource pool may identify multiple uplink transmission occasions that occur periodically. An uplink transmission occasion may include multiple transmission resources (e.g., time domain, frequency domain, spatial domain, and/or code domain) and multiple transmission times that may be allocated for the UE 120 to transmit a CG uplink communication. For example, the resource pool may identify PUSCH transmission occasions that include multiple PUSCH transmission resources that can be allocated for multiple transmission times. In some aspects, the configuration information may be used to configure multiple resource pools for CG uplink communications.

The configuration information may include an indication of an admission probability parameter that is associated with the resource pool. The admission probability parameter may control an admission probability for the UE 120 to access the resource pool to transmit a CG uplink communication. The admission probability parameter may be an admission probability threshold p or another parameter, such as an admission probability index $p_{index}$ that is used to determine the admission probability threshold p.

In some aspects, the configuration information may include an indication of the admission probability threshold p in order to directly set the admission probability threshold p for the resource pool. The admission probability threshold p determines the admission probability for the UE 120 to gain admission to the resource pool. The admission probability threshold p may be a threshold that is compared with a random number q selected by the UE 120 to determine if the UE 120 can access the resource pool to transmit a CG uplink communication. For example, the admission probability threshold p may be set as $0 \leq p \leq 1$ and a random number q in the range $0 \leq q \leq 1$ may satisfy the threshold (and allow admission to resource pool by the UE 120) if $q \geq p$.

In some aspects, the configuration information may indicate an admission probability parameter, or multiple admission probability parameters, that can be mapped to the admission probability threshold p. The configuration information may also include a mapping, such as a table, rule, formula, and/or curve, that maps the indicated admission probability parameter to the admission probability threshold p. For example, the configuration may include a mapping between values of an admission probability index $p_{index}$ and corresponding values for the admission probability threshold p. The configuration information may also include an indication of an admission probability index $p_{index}$ value that is mapped to a corresponding admission probability threshold p value using the mapping to set the admission probability threshold p for the resource pool. As shown in FIG. 4, the mapping between the admission probability index $p_{index}$ and the admission probability threshold p may be a table that includes corresponding values for the admission probability index $p_{index}$ and the admission probability threshold p. Additionally, and/or alternatively, another type of mapping, such as a rule, formula, and/or curve, may be used to map the admission probability index $p_{index}$ to the admission probability threshold p.

In the example of FIG. 4, the configuration information may be used to configure a resource pool with an admission probability threshold p of 0.5 (e.g., 50% admission probability). As shown in FIG. 4, the configuration information may set the admission probability threshold p to 0.5 by including an indication of an admission probability threshold p value of 0.5, or by including a mapping between admission probability index $p_{index}$ values (0, 1, . . . ) and corresponding admission probability threshold p values (0.5, 0.6, . . . ) and an indication of an admission probability index $p_{index}$ value of 0. Additionally, and/or alternatively, other admission probability parameters and/or other types of mappings may be included in the configuration and used to configure the admission probability threshold p for the resource pool.

In some aspects, an overall overloading indicator may be configured as an admission probability parameter that is used to control the admission probability for the resource pool. The configuration information may identify one or more mappings between values of the overall overloading indicator and corresponding values of the admission probability threshold p. The configuration information may be used to configure the UE 120 to apply the one or more mappings to determine the admission probability threshold p in response to receiving an indication of the overall overloading indicator from the base station 110.

In some aspects, the configuration information may indicate one admission probability parameter (e.g., admission probability threshold p and/or admission probability index $p_{index}$) to set the admission probability threshold p for the resource pool, and may also indicate one or more mappings (e.g., tables, rules, formulas, and/or curves) between values of one or more other admission probability parameters (e.g., an overall overloading indicator) and corresponding admission probability threshold p values. In this case, the configuration information may be used to configure the UE 120 to apply the one or more mappings in response to receiving a later indication of the one or more other admission parameters from the base station 110. In some aspects, the configuration information may be used to configure multiple different mappings to determine admission probability thresholds from one or more admission probability parameters, and index values for the multiple different mappings that may be used to select a mapping from the multiple different mappings to be used by the UE 120 to determine the admission probability threshold p.

In some aspects, the configuration information may be used to configure the UE 120 to monitor a group common physical downlink control channel (GC-PDCCH) for an indication that modifies the admission probability for the resource pool. For example, the configuration information may indicate a search space in which to monitor the GC-PDCCH and which downlink control information (DCI) (e.g., radio network temporary identifier (RNTI), length, bitfield position, and/or bitfield length) to monitor in the search space. The configuration information may be used to configure the UE 120 to monitor the same bit field in a GC-PDCCH communication as one or more other UEs, or may be used to configure the UE 120 to monitor a different bit field in the GC-PDCCH communication from one or more other UEs. Different resource pools configured for the UE 120 may be associated with the same bit field in the GC-PDCCH communication, or may be associated with different bit fields in the GC-PDCCH communication.

As further shown in FIG. 4, and by reference number 410, the base station 110 may determine that a utilization level of the resource pool satisfies a condition. The base station 110 may determine a measure of the utilization level of the resource pool and compare the measure of the utilization level of the resource pool with a threshold to determine whether the utilization level of the resource pool satisfies a condition. For example, if the measure of the utilization level of the resource pool satisfies the threshold, the base station 110 may determine that the utilization level of the resource pool satisfies an overloading condition. In some aspects, the base station 110 may continuously and/or periodically monitor and/or measure the utilization level of CG uplink transmission occasions in the resource pool and compare the measure of the utilization level with the threshold to determine if the utilization level satisfies the condition.

In some aspects, the base station 110 may compare the measure of the utilization level of the resource pool with a first threshold and/or a second threshold. If the measure of the utilization level of the resource pool satisfies the first threshold, the base station 110 may determine that the utilization level of the resource pool satisfies a first condition. If the measure of the utilization level of the resource pool satisfies the second threshold, the base station 110 may determine that the utilization level of the resource pool satisfies a second condition. For example, the first condition may be an overloading condition and the second condition may be an underutilization condition.

In some aspects, the base station 110 may determine the measure of utilization of the resource pool based at least in part on a RoT measurement associated with the resource pool. For example, the base station 110 may determine the RoT over the resources in the resource pool.

In some aspects, the base station 110 may determine the measure of utilization of the resource pool based at least in part on log likelihood ratios (LLRs) determined for CG uplink communications (e.g., CG uplink PUSCH communications) received in the resource pool. For example, the base station 110 may determine an average of the LLRs of the CG uplink communications (e.g., CG uplink PUSCH communications) received in the resource pool. The base station 110 may also identify which UEs (e.g., UE 120 and/or one or more other UEs) are transmitting the CG uplink communications (e.g., CG uplink PUSCH communications) received in the resource pool.

In some aspects, the base station 110 may determine the measure of utilization of the resource pool based at least in part on an occupancy ratio of the resources in the resource pool. For example, the base station 110 may determine an occupancy ratio of the resources in the spatial domain in the resource pool. The base station 110 may determine resource occupancy for resources in the resource pool based at least in part on CG uplink PUSCH communication decoding, DMRS detection in CG uplink PUSCH communications, and/or CG uplink control information (CG-UCI) detection in CG uplink PUSCH communications. The resource occupancy for the resources in the resource pool may also be adjusted based at least in part on detection of resource collision (e.g., multiple UEs transmitting CG uplink PUSCH communications in the same resource) by the base station 110. The base station 110 may also identify which UEs (e.g., UE 120 and/or one or more other UEs) are transmitting the CG uplink communications (e.g., CG uplink PUSCH communications) received in the resource pool.

As further shown in FIG. 4, and by reference number 415, the base station 110 transmits, to the UE 120, an indication that modifies the admission probability for the resource pool. The base station 110 may transmit the indication that modifies the admission probability for the resource pool in response to the determination that the utilization level of the resource pool satisfies a condition. For example, in a case in which the base station 110 determines that the utilization level of the resource pool satisfies an overloading condition, the base station 110 may transmit an indication that lowers the probability of the UE 120 accessing the resource pool (e.g., by raising the admission probability threshold p) in order to reduce overloading of the resource pool. In a case in which the base station 110 determines that the utilization level of the resource pool satisfies an underutilization condition (or does not satisfy the overloading condition), the base station 110 may transmit an indication that raises the probability of the UE 120 accessing the resource pool (e.g., by lowering the admission probability threshold p).

In some aspects, the indication may modify the admission probability for the resource pool by modifying an admission probability parameter that controls the admission probability for the resource pool. For example, the indication may directly modify the value of the admission probability threshold p for the resource pool, or the indication may modify the admission probability index $p_{index}$ to control the admission probability threshold p to be modified based on the configured mapping between the values of the admission probability index $p_{index}$ and the corresponding values of the admission probability threshold p.

In some aspects, the indication may modify the admission probability for the resource pool by modifying a mapping between an admission probability parameter and the admission probability threshold p. For example, the indication may modify the mapping between the values of admission probability index $p_{index}$ and the corresponding values of the admission probability threshold p, which may cause the admission probability threshold p to be modified even if the admission probability index $p_{index}$ is not changed. In another example, the indication may control the admission probability threshold p to be modified by modifying the mapping between the values of the admission probability index $p_{index}$ and the corresponding values of the admission probability threshold p and also modifying the admission probability index $p_{index}$.

In the example of FIG. 4, the indication may modify the admission probability for the resource pool by controlling the admission probability threshold p to be modified to 0.7. As shown in FIG. 4, the configuration may control the admission probability threshold p to be modified to 0.7 by indicating a modified admission probability threshold p value of 0.7, or by indicating a modified mapping between admission probability index $p_{index}$ values (0, 1, . . . ) and corresponding admission probability threshold p values (0.7, 0.8, . . . ) that maps the current value for the admission probability index $p_{index}$ of 0 (set by the configuration) to the admission probability threshold of 0.7.

The indication may specify a time domain range during which the modified admission probability is associated with the resource pool. In some aspects, the indication may specify a persistent time domain range. In this case, the modified admission probability (e.g., modified admission probability threshold p) is to be used by the UE 120 for admission control until another indication that modifies the admission probability for the resource pool is received by the UE 120. In some aspects, the indication may specify a limited time domain range for the modified admission probability. In this case, the modified admission probability is applied for a limited time duration from when the indication is received. The limited time domain range may be specified as an amount of time or an offset value from the indication. For example, as shown in FIG. 4, the indication specifies a limited time domain range for the modified admission probability of 10 slots for the modified admission probability. In some aspects, the indication may specify a time domain range with an admission probability pattern in the time domain. For example, the indication may identify a periodic high-low pattern that periodically switches between time periods in which the modified admission probability is used and time periods in which a different admission probability is used.

In some aspects, the base station 110 may transmit the indication to the UE 120 to perform UE-specific admission probability modification (e.g., UE-specific overloading control) for the UE 120. For example, base station 110 may transmit a UE-specific indication to the UE 120 in response to a determination that the UE 120 is involved in collision events in the resource pool. The UE-specific indication may be transmitted to the UE 120 in DCI (e.g., CG uplink activation/reactivation DCI and/or CG downlink feedback information DCI), a medium access control (MAC) control element, and/or an RRC communication.

In some aspects, the base station 110 may transmit the indication to a group of UEs, that includes the UE 120 and one or more other UEs, to perform group overloading control. The indication may be included in a GC-PDCCH communication transmitted by the base station 110 to the group of UEs including the UE 120 and the one or more other UEs. The indication may be included in a bit field of a GC-PDCCH communication that the UE 120 is configured to monitor. The UE 120 may monitor the same bit field in the GC-PDCCH communication as the one or more other UEs, or the UE 120 may monitor a different bit field in the GC-PDCCH communication from the one or more other UEs. Indications to dynamically modify the admission probabilities of different resource pools configured for the UE 120 may be included in the same bit field in the GC-PDCCH communication, or the UE 120 may be included in different bit fields in the GC-PDCCH communication.

The indication provided in the GC-PDCCH communication may dynamically modify the admission probability of the resource pool by indicating a modified admission probability parameter that controls the admission probability of the resource pool. For example, the indication in the GC-PDCCH communication may indicate a modified probability threshold p for the resource pool. Additionally, and/or alternatively, the indication in the GC-PDCCH communication may modify the admission probability index $p_{index}$ to control the admission probability threshold p to be modified based on the configured mapping between the admission probability index $p_{index}$ values and the corresponding admission probability threshold p values.

In some aspects, the dynamically modified admission probability for the resource pool may be "sticky," such that the modified admission probability (e.g., the modified admission probability thresholdp) is applied by the UE 120 for admission control for the resource pool until the admission probability is further dynamically modified by another indication from the base station 110. In some aspects, a timer may be started in response to the indication that dynamically modifies the admission probability for the resource pool, and expiration of the timer may trigger a reset to a default admission probability for the resource pool.

In some aspects, different UEs (e.g., the UE 120 and one or more other UEs) may be provided with different admission probability parameters (e.g., admission probability threshold p and/or admission probability index $p_{index}$). In some aspects, the indication may indicate a common admission probability parameter to the UE 120 and the one or more other UEs in the group of UEs. In this case, the UE 120 and the one or more other UEs may interpret the common admission probability parameter differently to derive different modified admission probabilities. For example, the indication may indicate a value of the admission probability index $p_{index}$ (e.g., in a bitfield of the GC-PDCCH communication). The UE 120 may be configured with a different mapping between the admission probability index $p_{index}$ values and the corresponding admission probability threshold p values, as compared with the one or more other UEs. Accordingly, the modified admission probability threshold p determined by the UE 120 based at least in part on the indicated admission probability index $p_{index}$ may be different from a modified probability threshold p determined by another UE in the group of UEs based at least in part on the indicated admission probability index $p_{index}$.

Additionally, and/or alternatively, the UE 120 may derive the modified admission probability (e.g., the modified admission probability thresholdp) based at least in part on the indicated admission probability parameter (e.g., the admission probability index $p_{index}$) and a quality of service (QoS) parameter associated with the traffic to be transmitted by the UE 120 in the CG uplink communication. Different UEs (e.g., the UE 120 and the one or more other UEs) may derive different modified admission probabilities from the same indicated admission probability parameter based at least in part on different QoS parameters associated with the traffic to be transmitted by the different UEs.

In some aspects, the UE 120 may utilize historic information together with the indicated admission probability parameter (e.g., the admission probability index $p_{index}$) to derive the modified admission probability (e.g., the modified admission probability threshold p). For example, the admission probability index p index may be indicated by a single bit in the GC-PDCCH communication, and the UE 120 may run an infinite impulse response (IIR) filter with the admission probability index $p_{index}$ as the input to determine the modified admission probability thresholdp. In this case, IIR filter parameters including lower and upper bounds may be configured by the configuration received from the base station 110.

In some aspects, the indication transmitted by the base station 110 may include an overall overloading indicator, and the modified admission probability threshold p may be determined based at least in part on the indicated overall overloading indicator. The overall overloading indicator may be a measure of the overall utilization/overloading of the resource pool determined by the base station 110. For example, the overall overloading indicator may be a value greater than or equal to 0 and less than or equal to 1, that corresponds to a percentage of occupancy/utilization of the resources in the resource pool. The UE 120 may use a configured mapping (e.g., curve, table, formula, and/or rule) between values of the overall overloading indicator and corresponding values of the admission probability threshold p to determine the modified admission probability threshold p based at least in part on the indicated overall overloading indicator. In some aspects, multiple mappings between values of the overall overloading indicator and corresponding values of the admission probability threshold p may be configured, and the UE 120 may select a mapping from the multiple configured mappings based on a priority associated with the traffic to be transmitted in the CG uplink communication. Different UEs may be configured with different mappings for the overall overloading indicator. Different resource pools for the same UE 120 may also be configured with different mappings for the overall loading indicator.

The indication may control the UE 120 to apply an admission probability threshold p that varies with time. If an admission probability threshold p for the UE 120 is high, the UE 120 may have a low probability to access the resource pool for each uplink transmission occasion, which may lead to a long delay for the UE 120. In some aspects, the modified admission probability thresholdp may be determined as a function of CG uplink transmission failures for the UE 120. For example, the modified admission probability threshold p may depend at least in part on a number of failed attempts to access the resource pool by the UE 120. The admission probability threshold p for the UE 120 may start at $p=p_{max}$ for the first time the UE 120 attempts to access the resource pool, where $p_{max}$ is a maximum admission probability threshold. If an attempt by the UE 120 to access the resource pool fails (e.g., q<p), the admission probability threshold p may be decreased with a certain step size $p_s$, subject to a lower bound of $p_{min}$. When an attempt by the UE 102 to access the resource pool is successful, the admission probability threshold p may be reset to $p=p_{max}$. The starting/maximum admission probability threshold $p_{max}$ may correspond to a default admission probability threshold and/or a first modified probability threshold for the UE 120.

In some aspects, the indication may modify the admission probability for the resource pool based at least in part on a change to a size of the resource pool. For example, in response to a decrease in the size of the resource pool size (e.g., some resources may be canceled due to a conflict with a semi-static time division duplex (TDD) pattern and/or by a slot formation indication (SFI)), the admission probability threshold p may be increased to lower the probability of admission to the resource pool by the UE 120, since the resource pool is smaller and will be overloaded more easily. The modification of the admission probability threshold p may be proportional to the change in the size of the resource pool.

As further shown in FIG. 4, and by reference number 420, the UE 120 performs an admission control procedure to attempt to access the resource pool, for CG uplink communication, using the modified admission probability. The UE 120 may perform admission control for an uplink transmission occasion in the resource pool based at least in part on a random number q determined by the UE 120 and the modified admission probability threshold p to determine whether the UE 120 can access the resources in the uplink transmission occasion. By setting the admission probability p, the base station 110 can dynamically control the probability of the UE 120 to access the uplink transmission occasion in the resource pool.

The UE 120 compares the random number q with the modified admission probability threshold p. If the random number q satisfies the modified admission probability thresholdp, the admission is successful and the UE 120 can utilize the uplink transmission occasion in the resource pool to transmit a CG uplink communication. If the random number does not satisfy the modified admission probability thresholdp, the admission has failed and the UE 120 cannot utilize the uplink transmission occasion in the resource pool to transmit a CG uplink communication. For example, the modified admission probability threshold p may be in a range 0≤p≤1 and the random number q may be generated such that 0≤q≤1. The UE 120 may compare the random number q with the modified admission probability threshold p and determine that admission is successful if q≥p.

In some aspects, q may be randomly generated by the UE 120 from a uniform distribution in a target range (e.g., between 0 and 1). In some aspects, different distributions may be used for determining q in order to weight q to be higher or lower based at least in part on one or more UE-specific parameters, such as a traffic QoS parameter and/or UE priority. In some aspects, q may be a pseudo-random number generated as a function of one or more parameters including a parameter associated with the base station 110 (e.g., base station ID), a parameter associated with the UE 120 (e.g., UE ID), a time, a resource pool index, and/or an MCS parameter.

In response to the UE 120 determining that the UE 120 can access an uplink transmission occasion in the resource pool, the UE 120 may select a resource in the uplink transmission occasion. In some aspects, the resource selection may be based at least in part on a UE-specific resource hashing function. The UE-specific resource hashing function may be based at least in part on various factors such as UE ID, time, and/or resource pool index. Any hashing that results in a random or pseudo-random distribution across the uplink transmission occasion may be used. The hashing may be communicated to the base station 110, such that the base station 110 will know which resource in the resource pool the UE 120 uses to transmit. In this case, the base station 110 can conserve resources by performing blind decoding of the CG PUSCH communication over the known resource for the UE 120 rather than across the entirety of the resource pool.

As further shown in FIG. 4, and by reference number 425, the UE 120, in response to successfully gaining access to the resource pool, transmits a CG uplink communication to the base station 110 using the resource pool. The UE 120 may transmit the CG uplink communication to the base station 110 on the selected resource in the uplink transmission occasion of the resource pool. For example, the UE 120 may transmit the CG uplink communication as a CG PUSCH communication using the selected resource. In some cases, the UE 120 may transmit CG-UCI with a UE ID associated with the UE 120 in the CG PUSCH communication, so that the base station 110 can identify which UE 120 is transmitting from the results of decoding the CG PUSCH communication.

Dynamically modifying an admission probability of a resource pool for CG uplink communication, as described in connection with FIG. 4, enables the base station 110 to dynamically adjust the admission probability for one or more UEs (e.g., UE 120 and/or one or more other UEs) to access the resource pool in order to reduce overloading of the resource pool. As a result, overloading of resource pools for CG uplink communications may be reduced and uplink communications from UEs to a base station may be performed more efficiently, thus increasing network reliability and/or speed and conserving computing resources (e.g., processing resources, memory resources, and/or communication resources) and/or networking resources that would have otherwise been used in networks with less network reliability and/or speed.

As indicated above, FIG. 4 is provided as an example. Other examples may differ from what is described with respect to FIG. 4.

Figure 5:
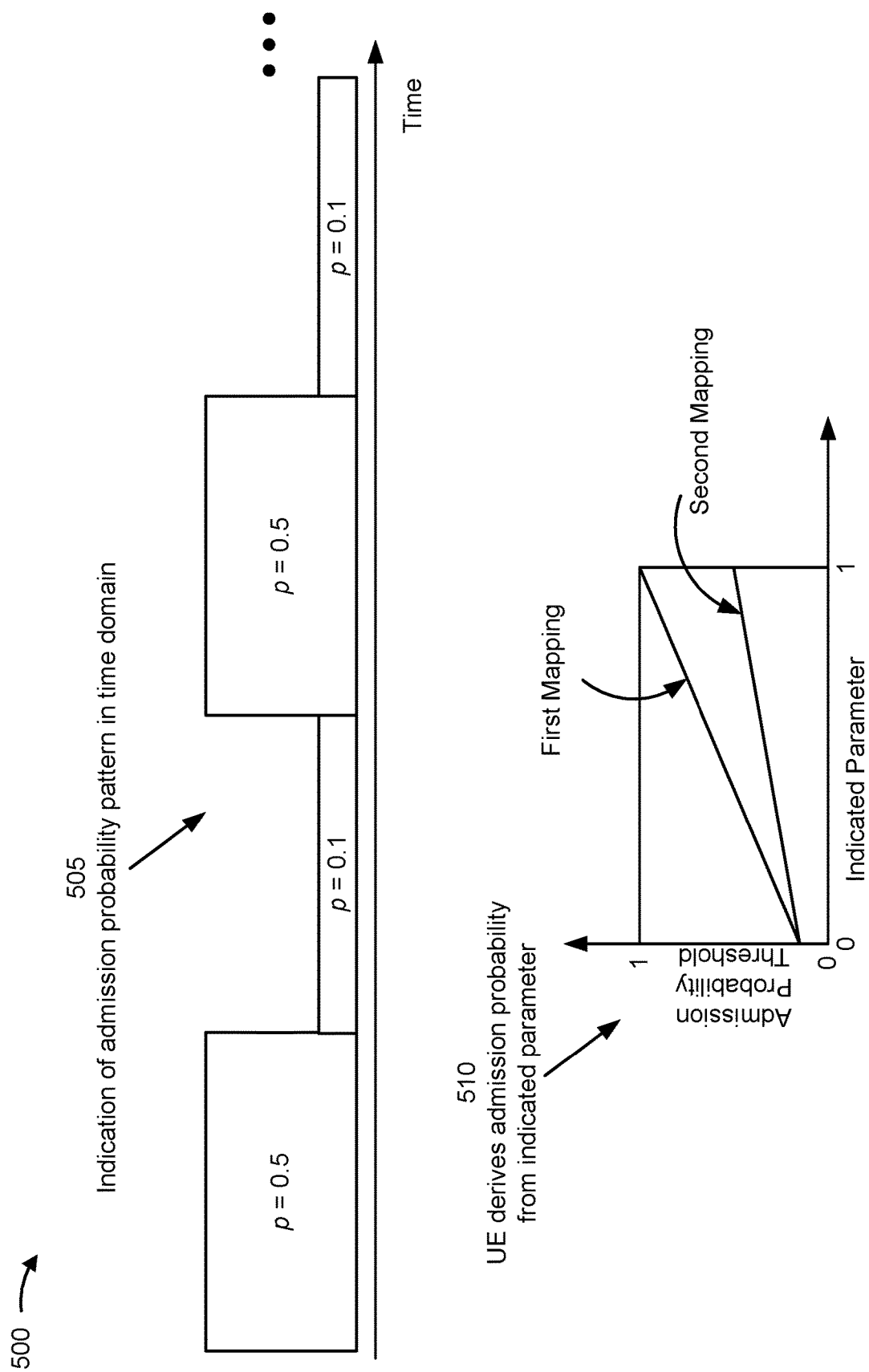

FIG. 5 is a diagram illustrating an example 500 associated with controlling an admission probability of a resource pool for CG uplink communication, in accordance with the present disclosure. As described above, the indication received from a base station (e.g., base station 110) that modifies an admission probability for a UE (e.g., UE 120) may include an indication that specifies a time domain range for the modified admission probability.

As shown in FIG. 5, and by reference number 505, an indication of an admission probability pattern in a time domain may be used to specify the time domain range for the modified admission probability. The admission probability pattern may be a periodic high-low pattern that periodically switches between time periods in which a first admission probability threshold p (e.g., p=0.5) is used by the UE for admission control and time periods in which a second admission probability threshold p (e.g., p=0.1) is used by the UE for admission control. In the example of FIG. 5, the first admission probability threshold (p=0.5) is higher than the second admission probability threshold (p=0.1), which will control the UE to have a lower probability of gaining admission to the resource pool in the time periods in which the first admission probability threshold is used than in the periods in which the second probability threshold is used.

As further shown in FIG. 5, and by reference number 510, a UE may derive an admission probability from an indicated parameter (e.g., admission probability index and/or overall overload indicator) using a mapping associated with the indicated parameter. For example, the mapping associated with the indicated parameter may be a mapping between values of the indicated parameter and values of an admission probability threshold. In the example of FIG. 5, a first curve defines a first mapping between the values of the indicated parameter and the values of the admission probability threshold, and a second curve defines a second mapping between the values of the indicated parameter and the values of the admission probability threshold.

In some aspects, a first UE may be configured to use the first mapping to derive an admission probability threshold value from the indicated parameter, and a second UE may be configured to use the second mapping to derive an admission probability threshold value from the indicated parameter. In some aspects, a UE may use the first mapping to derive an admission probability value for a first resource pool configured for the UE from the indicated parameter, and the UE may use the second mapping to derive an admission probability value for a second resource pool configured for the UE from the indicated parameter. In some aspects, a UE may use the first mapping to derive an admission probability value from the indicated parameter for traffic with a first priority level, and the UE may use the second mapping to derive an admission probability value from the indicated parameter for traffic with a second priority level. For example, the first priority level may be a relatively lower priority (e.g., when traffic has a relatively large delay budget), as compared to the second priority level. In some aspects, the indicated parameter may be an overall overloading indicator.

As indicated above, FIG. 5 is provided as an example. Other examples may differ from what is described with respect to FIG. 5.

Figure 6:
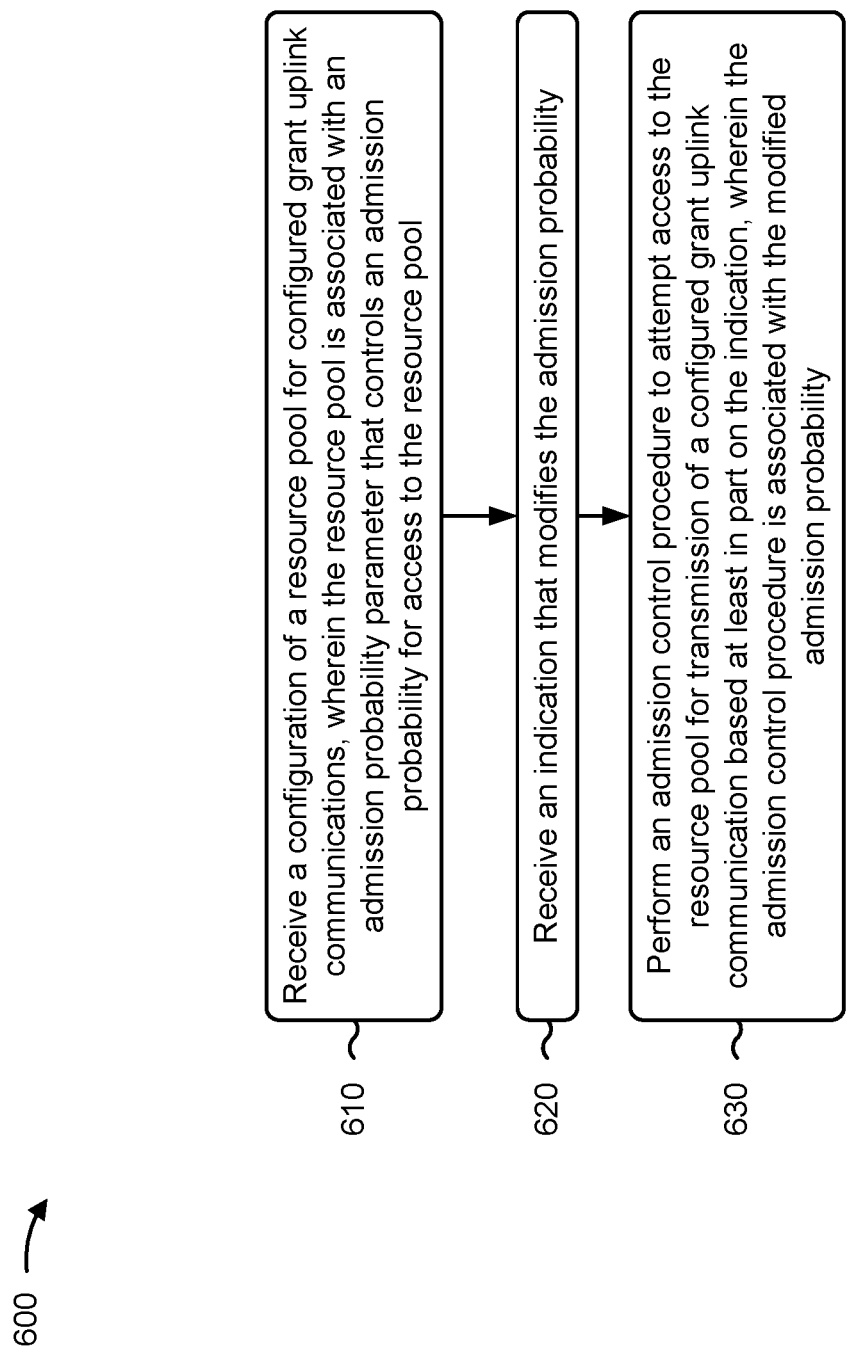
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with controlling an admission probability of a resource pool for CG uplink communication.

As shown in FIG. 6, in some aspects, process 600 may include receiving a configuration of a resource pool for configured grant uplink communications, wherein the resource pool is associated with an admission probability parameter that controls an admission probability for access to the resource pool (block 610). For example, the UE (e.g., using receive processor 258, transmit processor 264, controller/processor 280, and/or memory 282) may receive a configuration of a resource pool for configured grant uplink communications, as described above. In some aspects, the resource pool is associated with an admission probability parameter that controls an admission probability for access to the resource pool.

As further shown in FIG. 6, in some aspects, process 600 may include receiving an indication that modifies the admission probability, resulting in a modified admission probability (block 620). For example, the UE (e.g., using receive processor 258, transmit processor 264, controller/processor 280, and/or memory 282) may receive an indication that modifies the admission probability, resulting in a modified admission probability, as described above.

As further shown in FIG. 6, in some aspects, process 600 may include performing an admission control procedure to attempt access to the resource pool for transmission of a configured grant uplink communication based at least in part on the indication, wherein the admission control procedure is associated with the modified admission probability (block 630). For example, the UE (e.g., using receive processor 258, transmit processor 264, controller/processor 280, and/or memory 282) may perform an admission control procedure to attempt access to the resource pool for transmission of a configured grant uplink communication based at least in part on the indication, as described above. In some aspects, the admission control procedure is associated with the modified admission probability.

Process 600 may include additional aspects, such as any single aspect or any combination of aspects described below and/or in connection with one or more other processes described elsewhere herein.

In a first aspect, the indication modifies the admission probability parameter or a mapping between the admission probability parameter and a corresponding admission probability.

In a second aspect, alone or in combination with the first aspect, the resource pool is associated with the modified admission probability based at least in part on receiving the indication and until another indication that further modifies the admission probability is received.

In a third aspect, alone or in combination with one or more of the first and second aspects, the indication further indicates a time domain range during which the resource pool is associated with the modified admission probability.

In a fourth aspect, alone or in combination with one or more of the first through third aspects, the indication indicates that the time domain range ends upon reception of another indication that further modifies the admission probability.

In a fifth aspect, alone or in combination with one or more of the first through fourth aspects, the time domain range is indicated as an offset value from the indication.

In a sixth aspect, alone or in combination with one or more of the first through fifth aspects, the time domain range is a first set of periodic time periods associated with the modified admission probability, wherein a second set of period time periods is associated with a different admission probability than the modified admission probability.

In a seventh aspect, alone or in combination with one or more of the first through sixth aspects, the indication is included in at least one of downlink control information, a MAC control element, a radio resource control message, or a combination thereof.

In an eighth aspect, alone or in combination with one or more of the first through seventh aspects, the indication is specific to the UE.

In a ninth aspect, alone or in combination with one or more of the first through eighth aspects, the indication is for a group of UEs that includes the UE.

In a tenth aspect, alone or in combination with one or more of the first through ninth aspects, the indication is included in a group common PDCCH communication.

In an eleventh aspect, alone or in combination with one or more of the first through tenth aspects, the configuration indicates, for the UE, a mapping between a set of admission probability parameters and a corresponding set of admission probabilities for accessing the resource pool.

In a twelfth aspect, alone or in combination with one or more of the first through eleventh aspects, the configuration indicates, for the UE, a rule for deriving the modified admission probability from an indicated admission probability parameter.

In a thirteenth aspect, alone or in combination with one or more of the first through twelfth aspects, the configuration indicates a search space and a set of PDCCH occasions to be monitored by the UE for the indication.

In a fourteenth aspect, alone or in combination with one or more of the first through thirteenth aspects, different resource pools configured for the UE are associated with a same bit field in the group common PDCCH communication.

In a fifteenth aspect, alone or in combination with one or more of the first through fourteenth aspects, different resource pools configured for the UE are associated with different bit fields in the group common PDCCH communication.

In a sixteenth aspect, alone or in combination with one or more of the first through fifteenth aspects, the modified admission probability applies to subsequent uplink transmission occasions associated with the resource pool until at least one of: reception of a new indication that indicates a different admission probability than the modified admission probability, expiration of a timer that triggers a return to a default admission probability, or a combination thereof.

In a seventeenth aspect, alone or in combination with one or more of the first through sixteenth aspects, the modified admission probability is derived from an indicated admission probability parameter and a quality of service parameter associated with the configured grant uplink communication.

In an eighteenth aspect, alone or in combination with one or more of the first through seventeenth aspects, the modified admission probability is derived from an indicated admission probability parameter and a number of failed configured grant uplink communications.

In a nineteenth aspect, alone or in combination with one or more of the first through eighteenth aspects, the modified admission probability is derived from an indicated admission probability parameter and a size of the resource pool.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
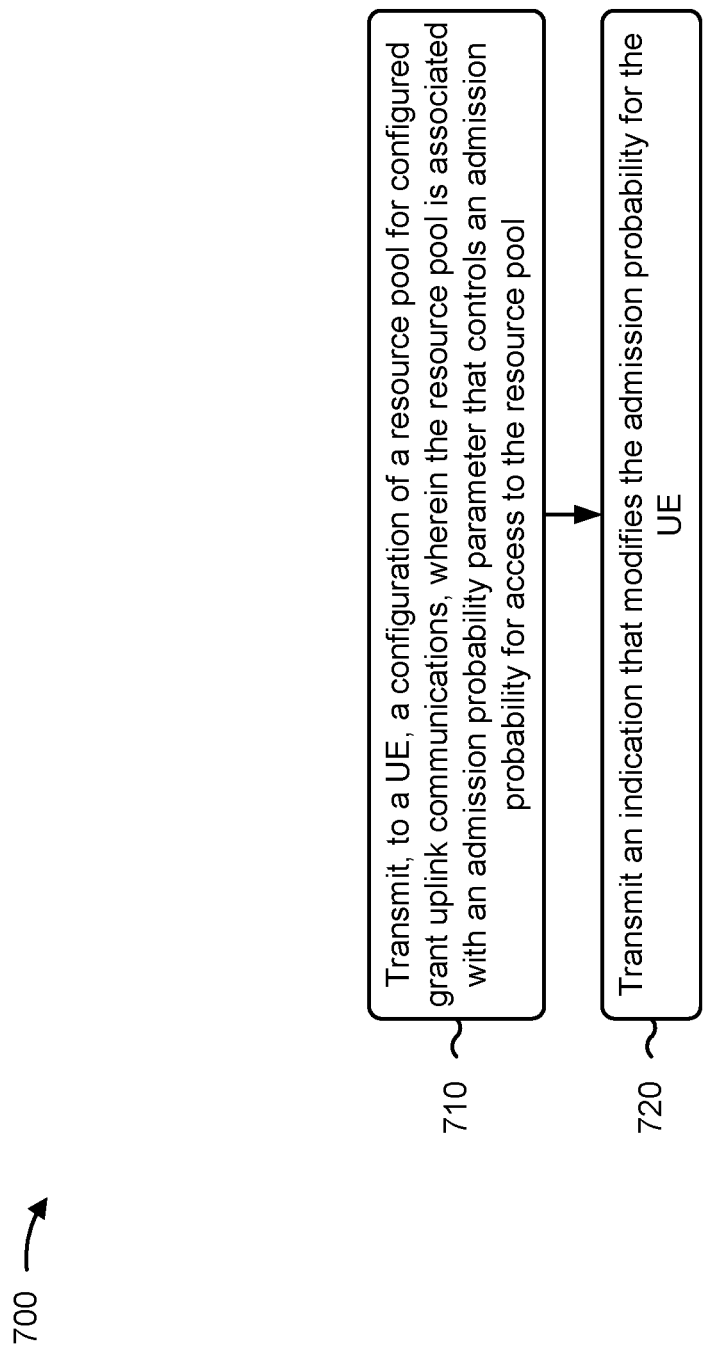
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with controlling an admission probability of a resource pool for CG uplink communication.

As shown in FIG. 7, in some aspects, process 700 may include transmitting, to a UE, a configuration of a resource pool for configured grant uplink communications, wherein the resource pool is associated with an admission probability parameter that controls an admission probability for access to the resource pool (block 710). For example, the base station (e.g., using transmit processor 220, receive processor 238, controller/processor 240, and/or memory 242) may transmit, to a UE, a configuration of a resource pool for configured grant uplink communications, as described above. In some aspects, the resource pool is associated with an admission probability parameter that controls an admission probability for access to the resource pool.

As further shown in FIG. 7, in some aspects, process 700 may include transmitting an indication that modifies the admission probability for the UE (block 720). For example, the base station (e.g., using transmit processor 220, receive processor 238, controller/processor 240, and/or memory 242) may transmit an indication that modifies the admission probability for the UE, as described above.

Process 700 may include additional aspects, such as any single aspect or any combination of aspects described below and/or in connection with one or more other processes described elsewhere herein.

In a first aspect, the indication that modifies the admission probability is transmitted based at least in part on a determination of a utilization level of the resource pool.

In a second aspect, alone or in combination with the first aspect, the utilization level is determined based at least in part on at least one of: a rise over thermal measurement associated with the resource pool, one or more log likelihood ratios determined for configured grant uplink communications received in the resource pool, an occupancy ratio of resources in the resource pool, or a combination thereof.

In a third aspect, alone or in combination with one or more of the first and second aspects, the indication modifies the admission probability parameter or a mapping between the admission probability parameter and a corresponding admission probability.

In a fourth aspect, alone or in combination with one or more of the first through third aspects, the resource pool is associated with the modified admission probability based at least in part on transmitting the indication and until another indication that further modifies the admission probability is transmitted.

In a fifth aspect, alone or in combination with one or more of the first through fourth aspects, the indication further indicates a time domain range during which the resource pool is associated with the modified admission probability.

In a sixth aspect, alone or in combination with one or more of the first through fifth aspects, the indication indicates that the time domain range ends upon reception of another indication that further modifies the admission probability.

In a seventh aspect, alone or in combination with one or more of the first through sixth aspects, the time domain range is indicated as an offset value from the indication.

In an eighth aspect, alone or in combination with one or more of the first through seventh aspects, the time domain range is a first set of periodic time periods associated with the modified admission probability, wherein a second set of period time periods is associated with a different admission probability than the modified admission probability.

In a ninth aspect, alone or in combination with one or more of the first through eighth aspects, the indication is included in at least one of downlink control information, a MAC control element, a radio resource control message, or a combination thereof.

In a tenth aspect, alone or in combination with one or more of the first through ninth aspects, the indication is specific to the UE.

In an eleventh aspect, alone or in combination with one or more of the first through tenth aspects, the indication is for a group of UEs that includes the UE.

In a twelfth aspect, alone or in combination with one or more of the first through eleventh aspects, the indication is included in a group common PDCCH communication.

In a thirteenth aspect, alone or in combination with one or more of the first through twelfth aspects, the configuration indicates, for the UE, a mapping between a set of admission probability parameters and a corresponding set of admission probabilities for accessing the resource pool.

In a fourteenth aspect, alone or in combination with one or more of the first through thirteenth aspects, the configuration indicates, for the UE, a rule for deriving the modified admission probability from an indicated admission probability parameter.

In a fifteenth aspect, alone or in combination with one or more of the first through fourteenth aspects, the configuration indicates a search space and a set of PDCCH occasions to be monitored by the UE for the indication.

In a sixteenth aspect, alone or in combination with one or more of the first through fifteenth aspects, different resource pools configured for the UE are associated with a same bit field in the group common PDCCH communication.

In a seventeenth aspect, alone or in combination with one or more of the first through sixteenth aspects, different resource pools configured for the UE are associated with different bit fields in the group common PDCCH communication.

In an eighteenth aspect, alone or in combination with one or more of the first through seventeenth aspects, the modified admission probability applies to subsequent uplink transmission occasions associated with the resource pool until at least one of: transmission of a new indication that indicates a different admission probability than the modified admission probability, expiration of a timer that triggers a return to a default admission probability, or a combination thereof.

In a nineteenth aspect, alone or in combination with one or more of the first through eighteenth aspects, the modified admission probability is derived from an indicated admission probability parameter and a quality of service parameter associated with the configured grant uplink communication.

In a twentieth aspect, alone or in combination with one or more of the first through nineteenth aspects, the modified admission probability is derived from an indicated admission probability parameter and a number of failed configured grant uplink communications.

In a twenty first aspect, alone or in combination with one or more of the first through twentieth aspects, the modified admission probability is derived from an indicated admission probability parameter and a size of the resource pool.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving a configuration of a resource pool for configured grant uplink communications, wherein the resource pool is associated with an admission probability parameter that controls an admission probability for access to the resource pool; receiving an indication that modifies the admission probability, resulting in a modified admission probability; and performing an admission control procedure to attempt access to the resource pool for transmission of a configured grant uplink communication based at least in part on the indication, wherein the admission control procedure is associated with the modified admission probability.

Aspect 2: The method of Aspect 1, wherein the indication modifies the admission probability parameter or a mapping between the admission probability parameter and a corresponding admission probability.

Aspect 3: The method of any of Aspects 1-2, wherein the resource pool is associated with the modified admission probability based at least in part on receiving the indication and until another indication that further modifies the admission probability is received.

Aspect 4: The method of any of Aspects 1-3, wherein the indication further indicates a time domain range during which the resource pool is associated with the modified admission probability.

Aspect 5: The method of Aspect 4, wherein the indication indicates that the time domain range ends upon reception of another indication that further modifies the admission probability.

Aspect 6: The method of Aspect 4, wherein the time domain range is indicated as an offset value from the indication.

Aspect 7: The method of Aspect 4, wherein the time domain range is a first set of periodic time periods associated with the modified admission probability, wherein a second set of period time periods is associated with a different admission probability than the modified admission probability.

Aspect 8: The method of any of Aspects 1-7, wherein the indication is included in at least one of downlink control information, a medium access control (MAC) control element, a radio resource control message, or a combination thereof.

Aspect 9: The method of any of Aspects 1-8, wherein the indication is specific to the UE.

Aspect 10: The method of any of Aspects 1-8, wherein the indication is for a group of UEs that includes the UE.

Aspect 11: The method of any of Aspects 1-10, wherein the indication is included in a group common physical downlink control channel (PDCCH) communication.

Aspect 12: The method of Aspect 11, wherein the configuration indicates, for the UE, a mapping between a set of admission probability parameters and a corresponding set of admission probabilities for accessing the resource pool.

Aspect 13: The method of Aspect 11, wherein the configuration indicates, for the UE, a rule for deriving the modified admission probability from an indicated admission probability parameter.

Aspect 14: The method of any of Aspects 11-13, wherein the configuration indicates a search space and a set of PDCCH occasions to be monitored by the UE for the indication.

Aspect 15: The method of any of Aspects 11-14, wherein different resource pools configured for the UE are associated with a same bit field in the group common PDCCH communication.

Aspect 16: The method of any of Aspects 11-15, wherein different resource pools configured for the UE are associated with different bit fields in the group common PDCCH communication.

Aspect 17: The method of any of Aspects 1-16, wherein the modified admission probability applies to subsequent uplink transmission occasions associated with the resource pool until at least one of: reception of a new indication that indicates a different admission probability than the modified admission probability, expiration of a timer that triggers a return to a default admission probability, or a combination thereof.

Aspect 18: The method of any of Aspects 1-17, wherein the modified admission probability is derived from an indicated admission probability parameter and a quality of service parameter associated with the configured grant uplink communication.

Aspect 19: The method of any of Aspects 1-18, wherein the modified admission probability is derived from an indicated admission probability parameter and a number of failed configured grant uplink communications.

Aspect 20: The method of any of Aspects 1-19, wherein the modified admission probability is derived from an indicated admission probability parameter and a size of the resource pool.

Aspect 21: A method of wireless communication performed by a base station, comprising: transmitting, to a user equipment (UE), a configuration of a resource pool for configured grant uplink communications, wherein the resource pool is associated with an admission probability parameter that controls an admission probability for access to the resource pool; and transmitting an indication that modifies the admission probability for the UE.

Aspect 22: The method of Aspect 21, wherein the indication that modifies the admission probability is transmitted based at least in part on a determination of a utilization level of the resource pool.

Aspect 23: The method of Aspect 22, wherein the utilization level is determined based at least in part on at least one of: a rise over thermal measurement associated with the resource pool, one or more log likelihood ratios determined for configured grant uplink communications received in the resource pool, an occupancy ratio of resources in the resource pool, or a combination thereof.

Aspect 24: The method of any of Aspects 21-23, wherein the indication modifies the admission probability parameter or a mapping between the admission probability parameter and a corresponding admission probability.

Aspect 25: The method of any of Aspects 21-24, wherein the resource pool is associated with the modified admission probability based at least in part on transmitting the indication and until another indication that further modifies the admission probability is transmitted.

Aspect 26: The method of any of Aspects 21-25, wherein the indication further indicates a time domain range during which the resource pool is associated with the modified admission probability.

Aspect 27: The method of Aspect 26, wherein the indication indicates that the time domain range ends upon reception, by the UE, of another indication that further modifies the admission probability.

Aspect 28: The method of Aspect 26, wherein the time domain range is indicated as an offset value from the indication.

Aspect 29: The method of Aspect 26, wherein the time domain range is a first set of periodic time periods associated with the modified admission probability, wherein a second set of period time periods is associated with a different admission probability than the modified admission probability.

Aspect 30: The method of any of Aspects 21-29, wherein the indication is included in at least one of downlink control information, a medium access control (MAC) control element, a radio resource control message, or a combination thereof.

Aspect 31: The method of any of Aspects 21-30, wherein the indication is specific to the UE.

Aspect 32: The method of any of Aspects 21-30, wherein the indication is for a group of UEs that includes the UE.

Aspect 33: The method of any of Aspects 21-32, wherein the indication is included in a group common physical downlink control channel (PDCCH) communication.

Aspect 34: The method of Aspect 33, wherein the configuration indicates, for the UE, a mapping between a set of admission probability parameters and a corresponding set of admission probabilities for accessing the resource pool.

Aspect 35: The method of Aspect 33, wherein the configuration indicates, for the UE, a rule for deriving the modified admission probability from an indicated admission probability parameter.

Aspect 36: The method of any of Aspects 33-35, wherein the configuration indicates a search space and a set of PDCCH occasions to be monitored by the UE for the indication.

Aspect 37: The method of any of Aspects 33-36, wherein different resource pools configured for the UE are associated with a same bit field in the group common PDCCH communication.

Aspect 38: The method of any of Aspects 33-36, wherein different resource pools configured for the UE are associated with different bit fields in the group common PDCCH communication.

Aspect 39: The method of any of Aspects 21-38, wherein the modified admission probability applies to subsequent uplink transmission occasions associated with the resource pool until at least one of: transmission of a new indication that indicates a different admission probability than the modified admission probability, expiration of a timer that triggers a return to a default admission probability, or a combination thereof.

Aspect 40: The method of any of Aspects 21-39, wherein the modified admission probability is derived from an indicated admission probability parameter and a quality of service parameter associated with the configured grant uplink communication.

Aspect 41: The method of any of Aspects 21-40, wherein the modified admission probability is derived from an indicated admission probability parameter and a number of failed configured grant uplink communications.

Aspect 42: The method of any of Aspects 21-41, wherein the modified admission probability is derived from an indicated admission probability parameter and a size of the resource pool.

Aspect 43: An apparatus for wireless communication at a device, comprising a processor; memory coupled with the processor; and instructions stored in the memory and executable by the processor to cause the apparatus to perform the method of one or more of Aspects 1-20.

Aspect 44: An apparatus for wireless communication at a device, comprising a processor; memory coupled with the processor; and instructions stored in the memory and executable by the processor to cause the apparatus to perform the method of one or more of Aspects 21-42.

Aspect 45: A device for wireless communication, comprising a memory and one or more processors coupled to the memory, the one or more processors configured to perform the method of one or more of Aspects 1-20.

Aspect 46: A device for wireless communication, comprising a memory and one or more processors coupled to the memory, the one or more processors configured to perform the method of one or more of Aspects 21-42.

Aspect 47: An apparatus for wireless communication, comprising at least one means for performing the method of one or more of Aspects 1-20.

Aspect 48: An apparatus for wireless communication, comprising at least one means for performing the method of one or more of Aspects 21-42.

Aspect 49: A non-transitory computer-readable medium storing code for wireless communication, the code comprising instructions executable by a processor to perform the method of one or more of Aspects 1-20.

Aspect 50: A non-transitory computer-readable medium storing code for wireless communication, the code comprising instructions executable by a processor to perform the method of one or more of Aspects 21-42.

Aspect 51: A non-transitory computer-readable medium storing a set of instructions for wireless communication, the set of instructions comprising one or more instructions that, when executed by one or more processors of a device, cause the device to perform the method of one or more of Aspects 1-20.

Aspect 52: A non-transitory computer-readable medium storing a set of instructions for wireless communication, the set of instructions comprising one or more instructions that, when executed by one or more processors of a device, cause the device to perform the method of one or more of Aspects 21-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a configuration of a resource pool for configured grant uplink communications, wherein the resource pool is associated with an admission probability parameter that controls an admission probability for access to the resource pool;
    receiving an indication that modifies the admission probability, resulting in a modified admission probability; and
    performing an admission control procedure to attempt access to the resource pool for transmission of a configured grant uplink communication based at least in part on the indication, wherein the admission control procedure is associated with the modified admission probability, and wherein the indication is included in a group common physical downlink control channel (PDCCH) communication.

2. The method of claim 1, wherein the indication modifies the admission probability parameter or a mapping between the admission probability parameter and a corresponding admission probability.

3. The method of claim 1, wherein the resource pool is associated with the modified admission probability based at least in part on receiving the indication and until another indication that further modifies the admission probability is received.

4. The method of claim 1, wherein the indication further indicates a time domain range during which the resource pool is associated with the modified admission probability, and wherein at least one of:
    the indication indicates that the time domain range ends upon reception of another indication that further modifies the admission probability,
    the time domain range is indicated as an offset value from the indication, or,
    the time domain range is a first set of periodic time periods associated with the modified admission probability, wherein a second set of period time periods is associated with a different admission probability than the modified admission probability.

5. The method of claim 1, wherein the indication is specific to the UE or the indication is for a group of UEs that includes the UE.

6. The method of claim 1, wherein the configuration indicates, for the UE, at least one of:
- a mapping between a set of admission probability parameters and a corresponding set of admission probabilities for accessing the resource pool, or
- a rule for deriving the modified admission probability from an indicated admission probability parameter.

7. The method of claim 1, wherein the configuration indicates a search space and a set of PDCCH occasions to be monitored by the UE for the indication.

8. The method of claim 1, wherein different resource pools configured for the UE are associated with a same bit field in the group common PDCCH communication.

9. The method of claim 1, wherein different resource pools configured for the UE are associated with different bit fields in the group common PDCCH communication.

10. The method of claim 1, wherein the modified admission probability applies to subsequent uplink transmission occasions associated with the resource pool until at least one of:
- reception of a new indication that indicates a different admission probability than the modified admission probability, expiration of a timer that triggers a return to a default admission probability, or a combination thereof.

11. The method of claim 1, wherein the modified admission probability is derived from an indicated admission probability parameter and a quality of service parameter associated with the configured grant uplink communication.

12. The method of claim 1, wherein the modified admission probability is derived from an indicated admission probability parameter and a number of failed configured grant uplink communications.

13. The method of claim 1, wherein the modified admission probability is derived from an indicated admission probability parameter and a size of the resource pool.

14. A user equipment (UE) for wireless communication, comprising:
- a memory; and
- one or more processors coupled to the memory, the one or more processors configured to:
  - receive a configuration of a resource pool for configured grant uplink communications, wherein the resource pool is associated with an admission probability parameter that controls an admission probability for access to the resource pool;
  - receive an indication that modifies the admission probability, resulting in a modified admission probability; and
  - perform an admission control procedure to attempt access to the resource pool for transmission of a configured grant uplink communication based at least in part on the indication, wherein the admission control procedure is associated with the modified admission probability, and wherein the indication is included in a group common physical downlink control channel (PDCCH) communication.

15. The UE of claim 14, wherein the indication modifies the admission probability parameter or a mapping between the admission probability parameter and a corresponding admission probability.

16. The UE of claim 14, wherein the resource pool is associated with the modified admission probability based at least in part on receiving the indication and until another indication that further modifies the admission probability is received.

17. The UE of claim 14, wherein the indication further indicates a time domain range during which the resource pool is associated with the modified admission probability, and wherein at least one of:
- the indication indicates that the time domain range ends upon reception of another indication that further modifies the admission probability,
- the time domain range is indicated as an offset value from the indication, or,
- the time domain range is a first set of periodic time periods associated with the modified admission probability, wherein a second set of period time periods is associated with a different admission probability than the modified admission probability.

18. The UE of claim 14, wherein the indication is specific to the UE or the indication is for a group of UEs that includes the UE.

19. The UE of claim 14, wherein the configuration indicates, for the UE, at least one of:
- a mapping between a set of admission probability parameters and a corresponding set of admission probabilities for accessing the resource pool, or
- a rule for deriving the modified admission probability from an indicated admission probability parameter.

20. The UE of claim 14, wherein the configuration indicates a search space and a set of PDCCH occasions to be monitored by the UE for the indication.

21. The UE of claim 14, wherein different resource pools configured for the UE are associated with a same bit field in the group common PDCCH communication.

22. The UE of claim 14, wherein different resource pools configured for the UE are associated with different bit fields in the group common PDCCH communication.

23. The UE of claim 14, wherein the modified admission probability applies to subsequent uplink transmission occasions associated with the resource pool until at least one of:
- reception of a new indication that indicates a different admission probability than the modified admission probability,
- expiration of a timer that triggers a return to a default admission probability, or
- a combination thereof.

24. The UE of claim 14, wherein the modified admission probability is derived from an indicated admission probability parameter and a quality of service parameter associated with the configured grant uplink communication.

25. The UE of claim 14, wherein the modified admission probability is derived from an indicated admission probability parameter and a number of failed configured grant uplink communications.

26. The UE of claim 14, wherein the modified admission probability is derived from an indicated admission probability parameter and a size of the resource pool.

27. A non-transitory computer-readable medium storing a set of instructions for wireless communication, the set of instructions comprising:
- one or more instructions that, when executed by one or more processors of a user equipment (UE), cause the UE to:
  - receive a configuration of a resource pool for configured grant uplink communications, wherein the resource pool is associated with an admission probability parameter that controls an admission probability for access to the resource pool;
  - receive an indication that modifies the admission probability, resulting in a modified admission probability; and perform an admission control procedure to attempt access to the resource pool for transmission of a configured grant uplink communication based at least in part on the indication, wherein the admission control procedure is associated with the modified admission probability, and wherein the indication is included in a group common physical downlink control channel (PDCCH) communication.

28. An apparatus for wireless communication, comprising:
- means for receiving a configuration of a resource pool for configured grant uplink communications, wherein the resource pool is associated with an admission probability parameter that controls an admission probability for access to the resource pool;
- means for receiving an indication that modifies the admission probability, resulting in a modified admission probability; and
- means for performing an admission control procedure to attempt access to the resource pool for transmission of a configured grant uplink communication based at least in part on the indication, wherein the admission control procedure is associated with the modified admission probability, and wherein the indication is included in a group common physical downlink control channel (PDCCH) communication.

* * * * *